(12) United States Patent
Siraux (10) Patent No.: US 9,109,058 B2
(45) Date of Patent: *Aug. 18, 2015

(54) METHOD FOR IMPROVING ETHYLENE POLYMERIZATION REACTIONS

(71) Applicant: TOTAL RESEARCH & TECHNOLOGY FELUY, Seneffe (Feluy) (BE)

(72) Inventor: Daniel Siraux, Naast (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,274

(22) Filed: Nov. 14, 2013

(65) Prior Publication Data

US 2014/0073748 A1 Mar. 13, 2014

Related U.S. Application Data

(63) Continuation of application No. 13/514,351, filed as application No. PCT/EP2010/070031 on Dec. 10, 2010, now Pat. No. 8,629,223.

(30) Foreign Application Priority Data

Dec. 18, 2009 (EP) .................................. 09179824

(51) Int. Cl.
| | |
|---|---|
| *C08F 2/00* | (2006.01) |
| *C08F 4/00* | (2006.01) |
| *C08F 210/00* | (2006.01) |
| *C08F 110/02* | (2006.01) |
| *C08F 10/02* | (2006.01) |

(52) U.S. Cl.
CPC ............... *C08F 110/02* (2013.01); *C08F 10/02* (2013.01)

(58) Field of Classification Search
CPC .......... C08F 10/02; C08F 110/02; C08F 2/01; C08F 2/14
USPC ........................................ 526/64, 348, 89, 90
See application file for complete search history.

(56) References Cited

U.S. PATENT DOCUMENTS

| | | | |
|---|---|---|---|
| 5,684,097 A * | 11/1997 | Palmroos et al. ............... | 526/64 |
| 6,977,283 B1 | 12/2005 | Shutt et al. | |
| 2003/0191251 A1 | 10/2003 | McGrath | |
| 2004/0014916 A1 | 1/2004 | Shamshoum et al. | |
| 2004/0151642 A1 | 8/2004 | Burns et al. | |

(Continued)

FOREIGN PATENT DOCUMENTS

| | | |
|---|---|---|
| EP | 0 630 910 A1 | 12/1994 |
| EP | 1842861 A1 | 10/2007 |

(Continued)

OTHER PUBLICATIONS

Encyclopedia of Chemical Technology, 3rd Edition, vol. 16, p. 390, 1981.

*Primary Examiner* — William Cheung (57) ABSTRACT

The present invention relates to a method for initiating an ethylene polymerization reaction in an ethylene polymerization loop reactor. More particularly, the invention relates to the timing upon which hydrogen is introduced into the ethylene polymerization loop reactor. The catalysts used in the ethylene polymerization reaction according to present invention are preferably metallocene catalysts.

15 Claims, 4 Drawing Sheets

(56) References Cited

U.S. PATENT DOCUMENTS

2004/0192861 A1   9/2004   Mutchler et al.
2007/0037937 A1*  2/2007   Damme ................... 526/64

FOREIGN PATENT DOCUMENTS

| WO | 95/26370     | A1 | 10/1995 |
| WO | 96/39450     | A1 | 12/1996 |
| WO | 97/32905     | A1 | 9/1997  |
| WO | 01/77190     | A1 | 10/2001 |
| WO | 20051000920  | A1 | 1/2005  |
| WO | 20051063830  | A1 | 7/2005  |
| WO | 20071113308  | A1 | 10/2007 |

* cited by examiner

METHOD FOR IMPROVING ETHYLENE POLYMERIZATION REACTIONS

CROSS-REFERENCE TO RELATED APPLICATIONS

This application is a Continuation of U.S. application Ser. No. 13/514,351, filed on Jun. 21, 2012, now U.S. Pat. No. 8,629,223, which claims the benefit of PCT/EP2010/070031, filed on Dec. 17, 2010, which claims priority from EP 09179824.9, filed on Dec. 18, 2009.

TECHNICAL FIELD OF THE INVENTION

The present invention relates to a method for initiating an ethylene polymerization reaction in an ethylene polymerization loop reactor. More particularly, the invention relates to the timing upon which hydrogen is introduced into the ethylene polymerization loop reactor. The catalysts used in the ethylene polymerization reaction according to present invention may be chromium, Ziegler-Natta or metallocene catalysts.

BACKGROUND OF THE INVENTION

Polyethylene (PE) is synthesized by polymerizing ethylene ($CH_2=CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed therefrom, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene comprise chromium catalysts, Ziegler-Natta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

It is known in the art that for the production of ethylene polymers having suitable properties it is important during polymerization to control reaction conditions, including reaction temperatures, reactant concentration, etc. Polymerization reactions are also sensitive to the quantity, quality and the type of catalyst utilized. Sub-optimal conditions at the start of or during the polymerization reaction may lead to a sub-optimal polymerization conditions resulting for instance in low production yields and/or the production of polymers having undesired properties and/or falling off specifications. In view thereof, ethylene polymerization reactions require accurate and adaptive monitoring and control of the reaction conditions.

In view thereof, it is an object of the present invention to provide a method for optimizing an ethylene polymerization process. More in particular, it is an object of the invention to provide a method for improving initiation procedures of the polymerization process, in particular in an ethylene polymerization loop reactor.

SUMMARY OF THE INVENTION

The present invention provides an improved initiation procedure for starting an ethylene polymerization process in an ethylene polymerization loop reactor. The present method also provides an optimization of the ethylene polymerization process. In particular, the present invention is based on an optimal injection of hydrogen into said ethylene polymerization loop reactor, in particular an optimal timing of injection of hydrogen.

In a first aspect, the present invention relates to a method for initiating the polymerization of ethylene monomers in an ethylene polymerization loop reactor wherein hydrogen is fed into said ethylene polymerization loop reactor prior to feeding at least one polymerization catalyst into said ethylene polymerization loop reactor. More in particularly such initiation method according to the present invention is a method for initiating the polymerization of ethylene monomers comprising the subsequent steps of:
(a) feeding into said ethylene polymerization loop reactor a liquid hydrocarbon diluent such as isobutane, ethylene monomers and hydrogen;
(b) feeding into said loop reactor at least one polymerization catalyst; and (c) polymerizing said ethylene monomers to produce a polyethylene slurry comprising liquid diluent and solid polyethylene particles;

characterized by feeding hydrogen into said ethylene polymerization loop reactor prior to feeding at least one polymerization catalyst into said ethylene polymerization loop reactor. Preferably, such initiation method according to the present invention is a method for initiating the polymerization of ethylene monomers comprising the subsequent steps of:

(a) feeding into said ethylene polymerization loop reactor a liquid hydrocarbon diluent such as isobutane, ethylene monomers and hydrogen;

(b) feeding into said loop reactor at least one metallocene polymerization catalyst; and (c) polymerizing said ethylene monomers to produce a polyethylene slurry comprising liquid diluent and solid polyethylene particles;

characterized by feeding hydrogen into said ethylene polymerization loop reactor prior to feeding at least one metallocene polymerization catalyst into said ethylene polymerization loop reactor.

A method for initiating the polymerization of ethylene monomers in an ethylene polymerization loop reactor as provided herein is also particularly suitable to be integrated in an ethylene polymerization process, as it permits to provide a high quality, and highly efficient ethylene polymerization process under optimal polymerization conditions. Therefore, the present invention also relates in another embodiment, to a method for performing an ethylene polymerization reaction in an ethylene polymerization loop reactor, comprising the steps of:

feeding ethylene monomer, a diluent, at least one polymerization catalyst, hydrogen, and optionally one or more optional co-monomer(s) to an ethylene polymerization loop reactor, polymerizing one or more ethylene monomers to produce a polyethylene slurry comprising liquid diluent and solid polyethylene particles, and recovering polyethylene particles from said slurry by separating at least a majority of the diluent from said slurry characterized in that said polymerization process is initiated according to the method described herein. Preferably, the invention relates in another embodiment, to a method for performing an ethylene polymerization reaction in an ethylene polymerization loop reactor, comprising the steps of: feeding ethylene monomer, a diluent, at least one metallocene polymerization catalyst, hydrogen, and optionally one or more optional co-monomer(s) to an ethylene polymerization loop reactor, polymerizing one or more ethylene monomers to produce a polyethylene slurry comprising liquid diluent and solid polyethylene particles, and recovering polyethylene particles from said slurry by separating at least a majority of the diluent from said slurry; characterized in that said polymerization process is initiated according to the method described herein.

In an embodiment, a method is provided as given above, wherein said ethylene polymerization loop reactor is a single loop reactor.

In another embodiment, a method is provided as given above, wherein said ethylene polymerization loop reactor is a first loop reactor of a double loop reactor, said double loop reactor comprising a first and a second loop reactor which are connected to each other in series.

In yet another embodiment, a method is provided characterized by further feeding hydrogen into said second loop reactor of said double loop reactor. In a preferred embodiment, said further hydrogen is fed into said second loop reactor of said double loop reactor according to the initiation method as given above.

According to another aspect, the present invention relates to the use of an initiation method of an ethylene polymerization process according to the present invention for preparing polyethylene in an ethylene polymerization loop reactor, comprising the steps of:

feeding ethylene monomer, a diluent, at least one polymerization catalyst, hydrogen, and optionally one or more optional co-monomer(s) to an ethylene polymerization loop reactor, wherein said polymerization process is initiated according to an initiation method according to the present invention;

polymerizing one or more ethylene monomers to produce a polyethylene slurry comprising liquid diluent and solid polyethylene particles, and recovering polyethylene particles from the slurry by separating at least a majority of the diluent from said slurry.

Preferably, the use of an initiation method of an ethylene polymerization process according to the present invention for preparing polyethylene in an ethylene polymerization loop reactor, comprises the steps of:

feeding ethylene monomer, a diluent, at least one metallocene polymerization catalyst, hydrogen, and optionally one or more optional co-monomer(s) to an ethylene polymerization loop reactor, wherein said polymerization process is initiated according to an initiation method according to the present invention;

polymerizing one or more ethylene monomers to produce a polyethylene slurry comprising liquid diluent and solid polyethylene particles, and recovering polyethylene particles from the slurry by separating at least a majority of the diluent from said slurry.

In accordance with the invention, the initiation method as described herein, involves the injection of hydrogen prior to the injection of catalyst. An adaptation of the initiation procedure as described herein is unconventional in the art, especially, since it would be expected that a skilled person for improving an ethylene polymerization process would generally consider to improve the catalysts, the amounts of ethylene monomers and catalysts used in the process, or process parameters such as the circulation velocity, process pressures and temperatures. However, unexpectedly, it was shown herein that an adaptation of the initiation procedure as described herein, could substantially influence the ethylene polymerization process. The present initiation method permits to improve the ethylene polymerization process. In particular it permits to increase stability of the polymerization process. Moreover, the polyethylene prepared in said improved polymerization process will have improved quality and properties, such as e.g. a satisfying melt flow index, homogeneity of the polymer, low gel formation, etc.

These and further aspects and embodiments of the invention are hereunder further explained in the following sections and in the claims, as well as illustrated by non-limiting figures.

The constructional details of valves, pumps etc. have been omitted in the drawings for clarity, it being within the skill of the art to supply these.

DETAILED DESCRIPTION OF THE INVENTION

Before the present method and devices used in the invention are described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein may be used in the practice or testing of the present invention, the preferred methods and materials are now described.

As used herein, the singular forms "a", "an", and "the" include both singular and plural referents unless the context clearly dictates otherwise. The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of". The recitation of numerical ranges by endpoints includes all numbers and fractions subsumed within the respective ranges, as well as the recited endpoints. The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed. All documents cited in the present specification are hereby incorporated by reference in their entirety.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Ethylene polymerization reactions include the feeding of ethylene monomers, liquid diluent, catalyst, optionally one or more co-monomer(s), and hydrogen into a reactor, e.g. a loop reactor, upon which the polymerization reaction is initiated. Suitable "ethylene polymerization" as described herein includes but is not limited to homo-polymerization of ethylene or the co-polymerization of ethylene and a higher 1-olefin co-monomer such as butene, 1-pentene, 1-hexene, 1-octene or 1-decene.

As used herein the term "co-monomer" refers to co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

Liquid diluents which are suitable for being used in accordance with the present invention are preferably liquid hydrocarbon diluents which may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts. In the present invention it is especially applicable to ethylene polymerization catalysts such as metallocene catalysts, chromium catalysts and/or Ziegler-Natta catalysts. Whereas a catalyst slurry refers to a composition comprising catalyst solid particles and a diluent, catalyst refers herein to the catalyst molecules either as such or provided on a carrier or support. The term "activating agent" as used herein refers to materials that can be used in conjunction with a catalyst in order to improve the activity of the catalyst during the polymerization reaction.

Catalyst is introduced into a polyethylene polymerization loop reactor under the form of a catalyst slurry prepared in a catalyst slurry preparation system. As used in the present invention, the term "catalyst slurry" refers to a composition comprising catalyst solid particles and a diluent. The solid particles can be suspended in the diluent, either spontaneously or by homogenization techniques, such as mixing. The solid particles can be inhomogeneously distributed in a diluent and form a sediment or deposit. In the present invention it is especially applicable to solid particles of ethylene polymerization catalyst in a liquid diluent. These slurries will be referred to herein as ethylene polymerization catalyst slurries.

By the term "solid particles" it is meant a solid provided as a collection of particles, such as for instance a powder or granulate. In the present invention it is especially applicable to a catalyst provided on a carrier or support. The support is preferably a silica (Si) support.

Diluents which are suitable for being used in accordance with the present invention to prepare a catalyst slurry may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, 05 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

The term "catalyst preparation system" refers to a device or system wherein catalyst particles, such as metallocene, chromium or Ziegler Natta catalyst particles are prepared. Said catalyst preparation system is connected to a polymerization loop reactor for supply of the prepared catalyst slurry to the reactor. In an exemplary embodiment, the catalyst slurry preparation system comprises one or more mud pots containing catalyst slurry, one or more conduits connecting the mud pot(s) to a mixing vessel for transferring catalyst slurry from the mud pot(s) to the mixing vessel, at least one mixing vessel wherein catalyst slurry is diluted to a concentration suitable for use in a polymerization reaction, and one or more conduits connecting the mixing vessel to a polymerization reactor for transferring the diluted catalyst slurry to the polymerization reactor. The latter conduits may be provided with pumping means for pumping the catalyst slurry from the mixing vessel to a polymerization reactor.

Figure 1:
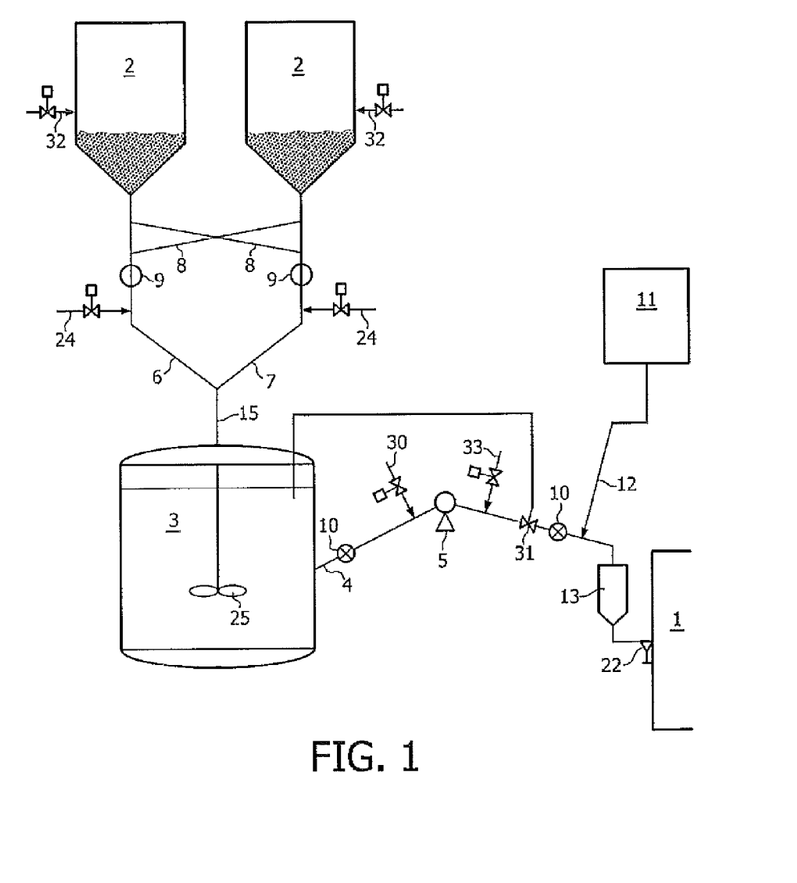
FIG. 1 schematically illustrates an embodiment of a catalyst preparation system for preparing and feeding catalyst slurry to an ethylene polymerization loop reactor.

A non-limiting example of a catalyst slurry preparation system according to the present invention is for instance illustrated in FIG. 1.

According to FIG. 1 a catalyst slurry preparation system is provided with two mud pots 2 containing concentrated catalyst slurry, and both provided with an injection valve 32 for addition of diluent into the mud pots 2. Conduits 6, 7 and 15 connect the mud pots 2 with a mixing vessel 3, wherein diluted catalyst slurry is stored. In the case illustrated in FIG. 1 wherein two mud pots 2 are provided, each having a conduit 6 or 7, the conduit 6 for transferring said catalyst slurry from a first storage vessel 2 to a mixing vessel 3 is interchangeable with a second conduit 7 for transferring said catalyst slurry from a second mud pot 2 to a mixing vessel 3 through lines 8 connecting said first 6 with said second 7 conduit. Such interconnection 8 permits, in case of interruption of transfer through one conduit 6, to discharge the catalyst slurry to the mixing vessel 3 through a second conduit 7. Conduit 6 and 7 may be provided with catalyst slurry feeders 9 for dosing the feed of catalyst slurry from the mud pots 2 to the mixing vessel 3. The conduits 6, 7 are further provided with injection valves 24 for the injection of diluent. The mixing vessel 3 is provided with mixing means 25. The conduit 4, as illustrated on FIG. 1, is further provided with a pulsation dampener, safety valves and diluent flushing means 30, 33, either at the inlet, at the outlet or at both sides of the pumps 5 as illustrated on FIG. 1. Diluent flushing means 30, 33 enable to flush diluent such as isobutane through the conduit 4 and to keep the conduit 4 and the pumping means 5 unplugged. In addition, the conduit 4 is further provided with flow measuring means 10 for easily measuring the catalyst flow rate in the conduit 4. These flow measuring means 10 preferably are Coriolis flow meters that can be provided upstream and downstream from said pumps 5. Conduit 4 may be further provided with a conduit and valve 31 for by-passing the pump 5. The conduits 4 for transferring catalyst slurry into to the reactor may also be equipped by one or more valves, preferably piston valves 22. The piston valves 22 are capable of sealing the orifice by which the conduit 4 is connected to the reactor 1.

A catalyst slurry preparation system according to the invention may further comprise a feeding system for an activating agent as illustrated on FIG. 1. As used herein the term "activating agent" refers to materials that can be used in conjunction with a catalyst in order to improve the activity of the catalyst during the polymerization reaction. Catalyst activating agents are well known in the art and will therefore not be discussed into detail herein. As illustrated on FIG. 1, a feeding system for an activating agent may comprise a storage vessel 11 for storing said activating agent and a conduit 12 intersecting the conduit 4. Conduit 4 may also comprise a contact vessel 13. Said vessels 13 have a diameter which is considerably larger than the diameter of the conduits 4, for improving mixing of the catalyst and the activating agent before supply to the reactor 1.

In a particular embodiment, the present invention relates to a method for initiating the polymerization of ethylene monomers in an ethylene polymerization loop reactor, wherein said method is characterized by feeding hydrogen into said ethylene polymerization loop reactor prior to feeding at least one polymerization catalyst into said ethylene polymerization loop reactor. In a preferred embodiment, the method for initiating the polymerization of ethylene monomers in an ethylene polymerization loop reactor, is characterized by feeding hydrogen into said ethylene polymerization loop reactor prior to feeding at least one metallocene polymerization catalyst into said ethylene polymerization loop reactor.

In another embodiment, the invention provides a method wherein step (a) comprises the subsequent steps of:
(a1) feeding into said ethylene polymerization loop reactor said liquid hydrocarbon diluent;
(a2) feeding into said ethylene polymerization loop reactor said ethylene monomers;
(a3) feeding into said ethylene polymerization loop reactor hydrogen;
characterized by performing said feeding steps (a1), (a2) and (a3) prior to feeding at least one polymerization catalyst into said ethylene polymerization loop reactor. Preferably said at least one catalyst is a metallocene catalyst.

By strictly ordering the sequence by which the different reactants are introduced into the ethylene polymerization loop reactor the applicants have shown that the subsequent ethylene polymerization reaction is efficient and provides ethylene polymers of high quality. The feed of liquid hydrocarbon diluent, ethylene monomers and hydrogen into the ethylene polymerization loop reactor may occur through a single feeding line or alternatively through multiple feeding lines distributed over the ethylene polymerization loop reactor. Said liquid hydrocarbon diluent, ethylene monomers and hydrogen may furthermore each be fed into the ethylene polymerization loop reactor through a feeding line specifically designed for feeding each specific reactant into said ethylene polymerization loop reactor. Catalyst is fed into said ethylene polymerization loop reactor through a separate feeding line.

It has been found that a regulation of the sequence of feeding hydrogen, ethylene monomers, liquid hydrocarbon diluent and catalyst into the reactor permits to provide an ethylene polymerization process showing increased stability. The present invention thus permits to optimize the ethylene polymerization reaction. The term "optimizing the polymerization reaction" refers to the improvement of the efficiency of the polymerization reaction and/or improvement of the quality and properties of the polymerization product obtained. The present invention therefore provides a method for obtaining a polyethylene end product having improved compositional homogeneity and improved quality. Fluctuations in the properties and quality of the polymerization product resulting from the polymerization reaction are substantially avoided.

For instance, by carrying out an initiation method according to present invention the amount of gel in the final polyethylene product can be significantly reduced.

In another example, the present method permits to prepare polyethylene having a satisfying Melt Flow Index (MFI). The Melt Flow Index (MFI) is a measure of the ease of flow of the melt of a thermoplastic polymer such as a polyethylene polymer. It is defined as the mass of polymer in grams flowing in 10 minutes through a capillary of specific diameter and length by a pressure applied via prescribed alternative gravimetric weights for alternative prescribed temperatures. The method is given in ASTM D1238 and ISO 1133. The MFI is an indirect measure of molecular weight, high melt flow rate corresponding to low molecular weight. For the purposes of the present invention, the melt flow index MI-2 is understood to denote the melt flow index measured according to ASTM D1238 and ISO 1133, under a load of 2.16 kg.

In a preferred embodiment according to the present invention, the polyethylene is prepared according to the method of the invention having an MI-2 value higher than 0.1, preferably higher than 0.25 and more preferably higher than 0.5. By feeding hydrogen into an ethylene polymerization loop reactor according to the present invention in a controlled and defined sequential manner in accordance with the present invention, the present invention permits to avoid the preparation of polyethylene having a low MI-2 value, e.g. a MI-2 below 0.1.

In a further embodiment, the method according to the present invention provides that said polymerization catalyst is a Ziegler-Natta catalyst, a chromium catalyst or a metallocene catalyst.

In a preferred embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Natta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

(Ar)$_2$MQ$_2$    (I);

or

R"(Ar)$_2$MQ$_2$    (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a C$_1$-C$_{20}$ alkylene, a germanium, a silicon, a siloxane, an alkylphosphine and an amine, and wherein said R" is optionally substituted with one or more substituents each independently selected from the group consisting of halogen, a hydrosilyl, a SiR$_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched C$_1$-C$_{20}$ alkyl; C$_3$-C$_{20}$ cycloalkyl; C$_6$-C$_{20}$ aryl; C$_7$-C$_{20}$ alkylaryl and C$_7$-C$_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl) zirconium dichloride (Cp$_2$ZrCl$_2$), bis(cyclopentadienyl) titanium dichloride (Cp$_2$TiCl$_2$), bis(cyclopentadienyl) hafnium dichloride (Cp$_2$HfCl$_2$); bis(tetrahydroindenyl) zirconium dichloride, bis (indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene[1-(4-tert-butyl-2-methyl-cyclopentadienyl)](fluoren-9-yl) zirconium dichloride.

The metallocene catalysts generally are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

In a preferred embodiment of the present invention, said catalyst is a chromium catalyst. The term "chromium catalysts" refers to catalysts obtained by deposition of chromium oxide on a support, e.g. a silica or aluminum support. Illustrative examples of chromium catalysts comprise but are not limited to $CrSiO_2$ or $CrAl_2O_3$.

In a preferred embodiment of the present invention, said catalyst is a Ziegler-Matta catalyst. The term "Ziegler-Natta catalyst" "refers to catalysts having a general formula $MX_n$, wherein M is a transition metal compound selected from group IV to VII, wherein X is a halogen, and wherein n is the valence of the metal. Preferably, M is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$.

In an embodiment, the invention provides a method wherein said polymerization catalyst is a metallocene catalyst and wherein said method is characterized by providing into said ethylene polymerization loop reactor a hydrogen concentration ranging between 20 and 4000 ppm, preferably ranging between, preferably ranging between 20 and 2000 ppm, preferably ranging between 150 and 1000 ppm, preferably ranging between 200 and 600 ppm, and preferably between 300 and 500 ppm.

Hydrogen is used in the ethylene polymerization reaction to control the molecular weight of the ethylene polymer. Injection of higher amounts of hydrogen leads to polymers with a lower mean molecular weight. It was now shown that the injection of hydrogen into the ethylene polymerization loop reactor is a very delicate process where small changes may effect the subsequent ethylene polymerization reaction in a substantial manner. Apart from the initiation procedure as given herein, the invention provides a method wherein injection of hydrogen occurs through a gradual increase of the feed also referred to as ramping. The ethylene polymerization reaction is sensitive for hydrogen and therefore the injection of hydrogen requires specific and accurate control and monitoring.

Furthermore, according to an embodiment, the invention provides a method comprising the step of additionally feeding into said ethylene polymerization loop reactor a co-monomer such as 1-butene, 1-hexene, 1-octene or 1-decene. In an ethylene polymerization reaction which requires co-monomers besides ethylene monomers, it has been found that the efficiency of the polymerization process and the quality of the obtained co-polymers is increased when the co-monomers are added to the ethylene polymerization loop reactor after the addition of the catalyst. Therefore, in a preferred embodiment, a method is provided wherein said co-monomer is injected after the injection of polymerization catalyst into said ethylene polymerization loop reactor.

Furthermore, the invention relates in another aspect to a method for performing an ethylene polymerization reaction in an ethylene polymerization loop reactor, comprising the steps of:
  initiating said ethylene polymerization reaction in said ethylene polymerization loop reactor according to according to a method as described herein;
  polymerizing one or more ethylene monomers to produce a polyethylene slurry comprising liquid diluent and solid polyethylene particles, and
  recovering polyethylene particles from said slurry by separating at least a majority of the diluent from said slurry.

Ethylene polymerization reactions preferably are carried out in an ethylene polymerization reactor and more preferably an ethylene polymerization loop reactor. A so-called loop reactor is well known in the art, and for instance described in the Encyclopaedia of Chemical Technology, 3rd edition, vol. 16 page 390. Loop reactors may be connected in parallel or in series. In this regard, in a double loop reactor where the two reactors are connected in series, a high molecular weight fraction may be produced in one loop reactor and a low molecular weight fraction may be produced in another loop reactor. In this way, a bimodal polymer or a polymer having a broad molecular weight distribution is made. In a double loop reactor where the two reactors are connected in parallel, either a monomodal or a bimodal product is made.

According to a specific embodiment the invention provides a method as described herein wherein said ethylene polymerization loop reactor is a single loop reactor.

According to another specific embodiment the invention provides a method as described herein wherein said ethylene polymerization loop reactor is a double loop reactor. A double loop reactor is a reactor comprising a first and a second loop reactor which are connected to each other in series. Hence, in an embodiment the invention provides a method as described herein wherein said ethylene polymerization loop reactor is a loop reactor of a double loop reactor.

Figure 2:
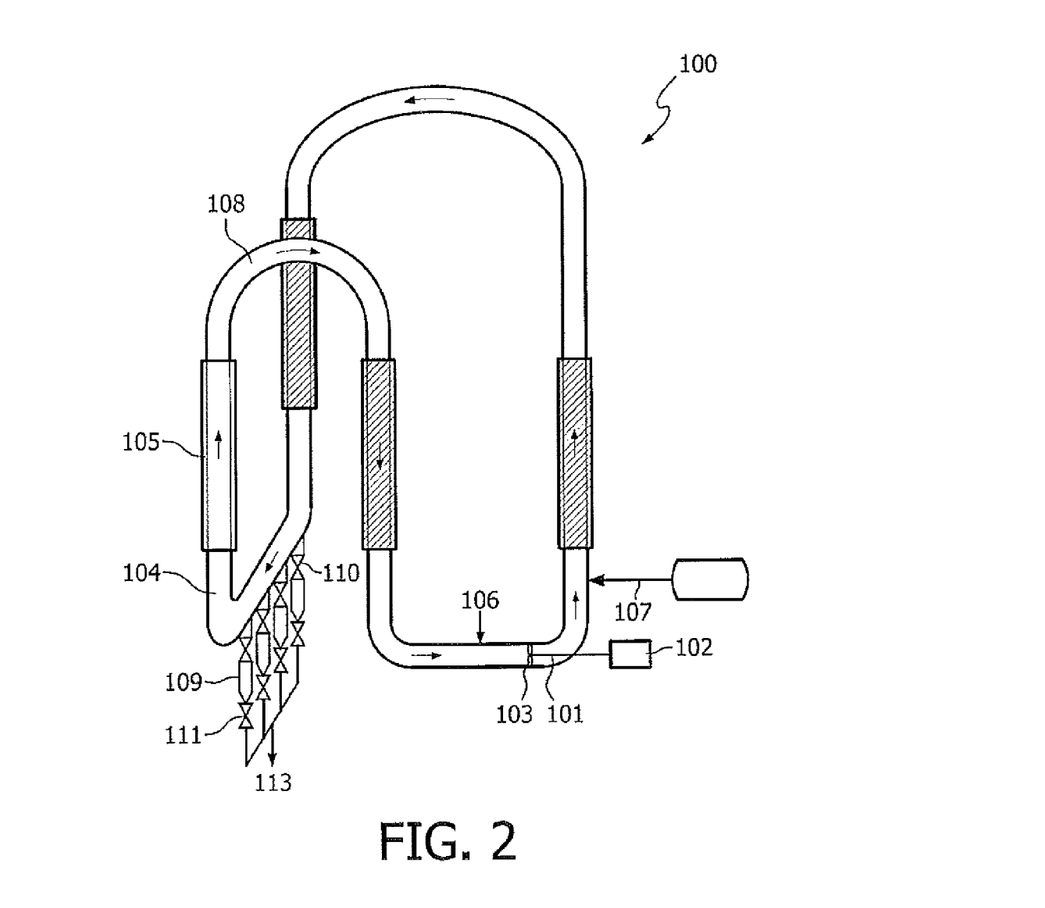
FIG. 2 schematically illustrates an embodiment of an ethylene polymerization single loop reactor for performing an ethylene polymerization reaction.
Figure 3:
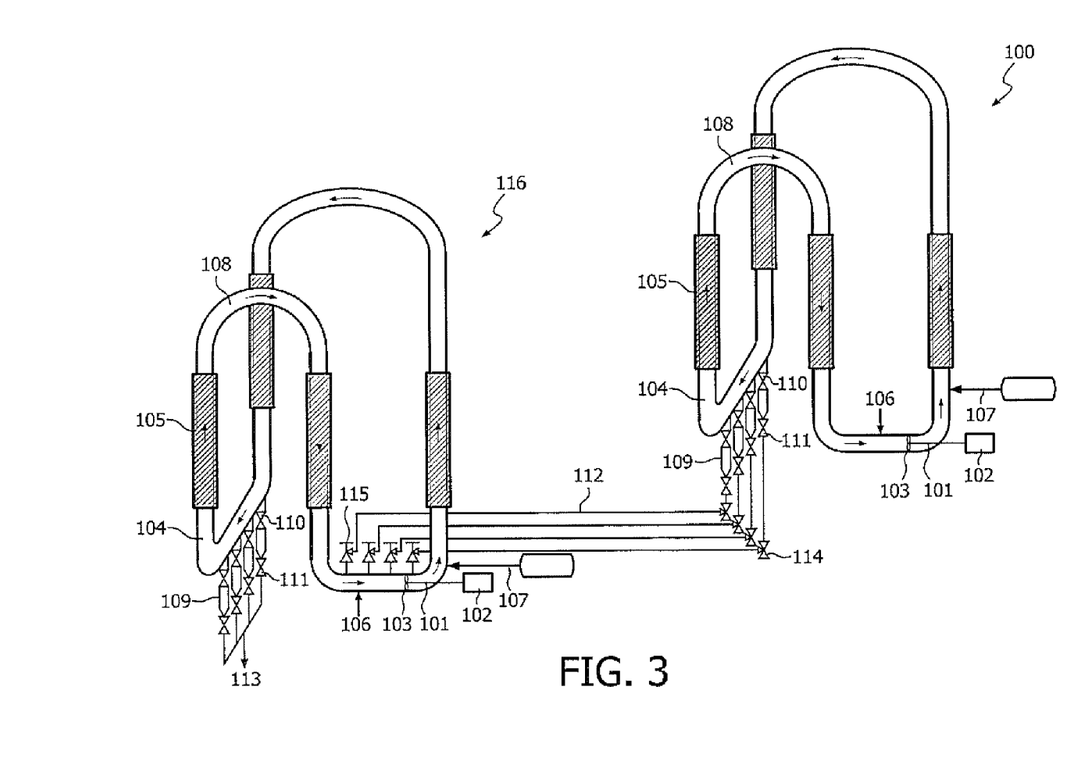
FIG. 3 schematically illustrates an embodiment of an ethylene polymerization double loop reactor for performing an ethylene polymerization reaction.

A non-limiting example of an ethylene polymerization loop reactor according to the present invention is for instance illustrated in FIGS. 2 and 3.

According to FIG. 2 an embodiment of an ethylene polymerization single loop reactor 100 is provided, comprising a plurality of interconnected pipes 104. The vertical sections of the pipe segments 104 are preferably provided with heat jackets 105. Polymerization heat can be extracted by means of cooling water circulating in these jackets of the reactor. Reactants are introduced into the reactor 100 by line 107. Catalyst, optionally in conjunction with a co-catalyst or activation agent, is injected in the reactor 100 by means of the conduct 106. The polymerization slurry is directionally circulated throughout the loop reactor 100 as illustrated by the arrows 108 by one or more pumps, such as axial flow pump 101. The pump may be powered by an electric motor 102. As used herein the term "pump" includes any device from compressing driving, raising the pressure of a fluid, by means for example of a piston or set of rotating impellers 103. The reactor 100 is further provided with one or more settling legs 109 connected to the pipes 104 of the reactor 100. The settling legs 109 are preferably provided with an isolation valve 110. These valves 110 are open under normal conditions and can be closed for example to isolate a settling leg from operation. Further the settling legs can be provided with product take off or discharge valves 111. The discharge valve 111 may be any type of valve, which can permit continuous or periodical discharge of polymer slurry, when it is fully open. Polymer slurry settled in the settling legs 109 may be removed by means of one or more product recovery lines 113, e.g. to a product recovery zone.

According to FIG. 3 an embodiment of an ethylene polymerization double loop reactor 100/116 is provided, comprising two single loop reactors 100 and 116, which are interconnected in series. Both reactors 100, 116 consist of a plurality of interconnected pipes 104. The vertical sections of the pipe segments 104 are preferably provided with heat jackets 105. Reactants are introduced into the reactors 100 by line 107. Catalyst, optionally in conjunction with a co-catalyst or activation agent, is injected in the reactor 100 or 116 by means of the conduct 106. The polymerization slurry is directionally circulated throughout the loop reactors 100, 116 as illustrated by the arrows 108 by one or more pumps, such as axial flow pump 101. The pumps may be powered by an electric motor 102. The pumps may be provided with a set of rotating impellers 103. The reactors 100, 116 are further provided with one or more settling legs 109 connected to the pipes 104 of the reactors 100, 116. The settling legs 109 are preferably provided with an isolation valve 110. Further the settling legs can be provided with product take off or discharge valves 111. Downstream the valve 111 at the exit of the settling leg 109 of reactor 100, a three-way valve 114 is provided which allows to transfer polymer slurry settled in the settling legs 109 to the other reactor 116, by means of the transfer line 112. The transfer line 112 connects the three-way valve 114, provided at the exit of the settling leg 109 of one reactor 100, with the entry in the other reactor 116, where preferably a piston valve 115 is provided. Polymer slurry settled in the settling legs 109 of reactor 116 can be removed by means of one or more product recovery lines 113, e.g. to a product recovery zone.

According to another embodiment the invention provides a method for performing an ethylene polymerization reaction as given above in an ethylene polymerization double loop reactor wherein the polymerization process is initiated as provided herein in the first loop, and wherein hydrogen is further fed into said second loop reactor of said double loop reactor. When an ethylene polymerization double loop reactor comprising two serially connected reactors is used for performing ethylene polymerization reactions reactants such as diluent, catalyst and/or ethylene monomers and co-monomers may be fed into both reactors. However, hydrogen is usually only fed into one of the loop reactor. In an example, hydrogen can be fed into the first reactor and by means of a transfer line, connecting the first and second loop reactor, polymer slurry, which includes hydrogen, is transferred into the second loop reactor. However, in such case, the direct feed of hydrogen into the second loop reactor has also been found to improve the stability of the polymerization process in a double loop reactor, thereby improving the efficiency and quality of the polymerization process. Feeding of hydrogen in the second reactor is preferably also initiated by applying the initiation procedure as given above.

EXAMPLES

This example shows that initiating ethylene polymerization by feeding hydrogen into the polymerization reactor after feeding a metallocene polymerization catalyst into the polymerization reactor lead to several problems, which can be corrected by initiating ethylene polymerization by feeding hydrogen into the polymerization reactor prior to feeding said metallocene catalyst.

Figure 4:
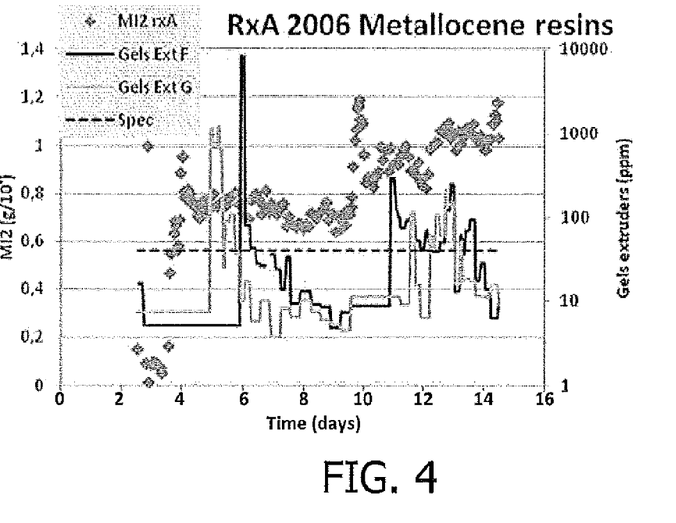
FIG. 4 represents a graph measuring MI2/gels as a function of time.

The polymerization of ethylene monomers in an ethylene polymerization loop reactor was started on day 0 without feeding hydrogen into the reactor (FIG. 4). After the initiation of the polymerization by feeding metallocene polymerization catalyst into the loop reactor, hydrogen was introduced. From day 4, material according to specification was produced. However, when this material arrived in the extruders, high gel level was observed during about 2 days and the material had to be downgraded in off-specification material. Off-specification material with gels was also produced (day 6) when producing a different resin type more sensitive to gels (FIG. 4). Therefore, problems of gels are caused when initiating ethylene polymerization by feeding hydrogen after feeding the metallocene polymerization catalyst into the loop reactor. The present inventors have found that these problems could be avoided by initiating the polymerization and feeding hydrogen into the reactor prior to adding the metallocene catalyst therein.

What is claimed:

1. A method for initiating polymerization comprising:
   feeding one or more monomers and hydrogen into a loop reactor, wherein the one or more monomers comprise ethylene monomers, and wherein the loop reactor is a single loop reactor or a double loop reactor;
   feeding at least one polymerization catalyst into the loop reactor;
   polymerizing the one or more monomers; and
   removing polymer slurry from the loop reactor through one or more product recovery lines to a product recovery zone;
   characterized by feeding the hydrogen into the loop reactor prior to feeding the at least one polymerization catalyst into the loop reactor.

2. The method of claim 1, wherein the one or more monomers further comprise aliphatic $C_3$-$C_{20}$ alpha-olefins.

3. The method of claim 1, wherein the one or more monomers further comprise propylene, 1-butene, 4-methyl-1-pentene, 1-hexene, 1-octene, 1-decene, 1-dodecene, 1-tetradecene, 1-hexadecene, 1-octadecene, or 1-eicosene.

4. The method of claim 1, wherein the loop reactor is the single loop reactor.

5. The method of claim 1, wherein the loop reactor is the double loop reactor that comprises a first loop and a second loop connected in series.

6. The method of claim 5, further comprising feeding hydrogen into the second loop.

7. The method of claim 1, wherein the at least one polymerization catalyst comprises a metallocene polymerization catalyst.

8. The method of claim 1, wherein the at least one polymerization catalyst comprises a chromium catalyst.

9. The method of claim 1, wherein the at least one polymerization catalyst comprises a Ziegler-Natta catalyst.

10. The method of claim 1, wherein the hydrogen is fed into the loop reactor after the ethylene monomers.

11. The method of claim 1, wherein the method is characterized by providing into the loop reactor a hydrogen concentration ranging between 20 and 4000 ppm.

12. The method of claim 1, wherein the method is characterized by providing into the loop reactor a hydrogen concentration ranging between 300 and 500 ppm.

13. The method of claim 4, further comprising recovering polyethylene particles from the polymer slurry by separating at least a majority of diluent from the polymer slurry.

14. The method of claim 5, further comprising recovering polyethylene particles from the polymer slurry by separating at least a majority of diluent from the polymer slurry.

15. A method for initiating polymerization comprising the subsequent steps of:
- feeding liquid hydrocarbon diluent into a loop reactor;
- subsequently feeding ethylene monomers into the loop reactor;
- subsequently feeding hydrogen into the loop reactor;
- feeding at least one polymerization catalyst into the loop reactor; and
- polymerizing the ethylene monomers;
- characterized by feeding the hydrogen into the loop reactor prior to feeding the at least one polymerization catalyst into the loop reactor.

* * * * *